United States Patent
Cheng et al.

(10) Patent No.: US 10,122,685 B2
(45) Date of Patent: Nov. 6, 2018

(54) METHOD FOR AUTOMATICALLY ESTABLISHING WIRELESS CONNECTION, GATEWAY DEVICE AND CLIENT DEVICE FOR INTERNET OF THINGS USING THE SAME

(71) Applicants: Tatung Company, Taipei (TW); TATUNG UNIVERSITY, Taipei (TW)

(72) Inventors: Fu-Chiung Cheng, Taipei (TW); Po-Chung Chang, Taipei (TW); Tai-Jee Pan, Taipei (TW)

(73) Assignees: Tatung Company, Taipei (TW); TATUNG UNIVERSITY, Taipei (TW)

( * ) Notice: Subject to any disclaimer, the term of this patent is extended or adjusted under 35 U.S.C. 154(b) by 340 days.

(21) Appl. No.: 14/957,608

(22) Filed: Dec. 3, 2015

(65) Prior Publication Data
US 2017/0063807 A1    Mar. 2, 2017

Related U.S. Application Data

(60) Provisional application No. 62/210,421, filed on Aug. 26, 2015.

(51) Int. Cl.
| | |
|---|---|
| *H04L 29/06* | (2006.01) |
| *H04W 12/06* | (2009.01) |
| *H04W 76/10* | (2018.01) |
| *H04W 48/20* | (2009.01) |
| *H04L 29/08* | (2006.01) |
| *H04W 88/16* | (2009.01) |
| *H04W 84/12* | (2009.01) |

(52) U.S. Cl.
CPC .......... *H04L 63/0227* (2013.01); *H04L 63/08* (2013.01); *H04L 63/083* (2013.01);
(Continued)

(58) Field of Classification Search
CPC .... H04L 63/0227; H04L 63/08; H04W 12/08; H04W 48/20
(Continued)

(56) References Cited

U.S. PATENT DOCUMENTS 9,079,060 B2 * 7/2015 Hong ..................... A63B 71/06
9,503,452 B1 * 11/2016 Kumar ................. H04L 67/306
(Continued)

FOREIGN PATENT DOCUMENTS

| CN | 102711215 | 10/2012 |
|---|---|---|
| CN | 104302015 | 1/2015 |

(Continued)

OTHER PUBLICATIONS

"Office Action of Taiwan Counterpart Application," dated May 24, 2017, p. 1-p. 3.

*Primary Examiner* — William S Powers
(74) *Attorney, Agent, or Firm* — JCIPRNET

(57) ABSTRACT

A method for automatically establishing a wireless connection, a gateway device and a client device for internet of things (IoT) using the same are provided. According to the provided method, SSID of the gateway device can be composed of an encrypted access password and an index, so that the client device may identify the gateway device to be connected according to the index within the SSID string and acquire the encrypted access password from the SSID string. Therefore, the client device can decrypt the encrypted access password. Accordingly, the wireless connection between the client device and the gateway device can be automatically established since the client device acquires the access password from the SSID of the gateway device.

26 Claims, 6 Drawing Sheets

(52) U.S. Cl.
CPC ........... *H04L 67/125* (2013.01); *H04W 12/06* (2013.01); *H04W 48/20* (2013.01); *H04W 76/10* (2018.02); *H04W 84/12* (2013.01); *H04W 88/16* (2013.01)

(58) Field of Classification Search
USPC ........................................................ 713/168
See application file for complete search history.

(56) References Cited

U.S. PATENT DOCUMENTS

| | | | | |
|---|---|---|---|---|
| 2012/0011360 | A1* | 1/2012 | Engels | .................... H04L 9/006 |
| | | | | 713/166 |
| 2012/0290689 | A1* | 11/2012 | Beguelin | ................ H04L 67/125 |
| | | | | 709/220 |
| 2013/0014224 | A1 | 1/2013 | Graves et al. | |
| 2014/0080450 | A1 | 3/2014 | Gupta et al. | |
| 2015/0130957 | A1 | 5/2015 | Berelejis et al. | |
| 2015/0195710 | A1 | 7/2015 | Bar-Niv et al. | |
| 2016/0057122 | A1* | 2/2016 | van Bergeijk | .......... H04L 63/08 |
| | | | | 713/168 |

FOREIGN PATENT DOCUMENTS

| | | |
|---|---|---|
| TW | 200822626 | 5/2008 |
| TW | 200847684 | 12/2008 |
| TW | 201216029 | 4/2012 |
| TW | 201410055 | 3/2014 |
| WO | 2010022274 | 2/2010 |

* cited by examiner

METHOD FOR AUTOMATICALLY ESTABLISHING WIRELESS CONNECTION, GATEWAY DEVICE AND CLIENT DEVICE FOR INTERNET OF THINGS USING THE SAME

CROSS-REFERENCE TO RELATED APPLICATION

This application claims the priority benefit of U.S. provisional application Ser. No. 62/210,421, filed on Aug. 26, 2015. The entirety of the above-mentioned patent application is hereby incorporated by reference herein and made a part of this specification.

BACKGROUND OF THE INVENTION

Field of the Invention

The invention relates to wireless communications technology, and particularly relates to a method for automatically establishing a wireless connection, a gateway device and a client device for internet of things (IoT) using the same.

Description of Related Art

The concept of Internet of Things (IoT) made in 1999, refers to RFID, infrared, GPS, laser scanning and other information sensing device wirelessly connected to the Internet through information exchange and communication, intelligent identification, positioning, tracking, monitoring and management further information obtained tentacles extend to the perception layer, so as to achieve a more wide interoperability.

Since the Wireless Fidelity (Wi-Fi) networks become one of the most popular application of wireless communication, using Wi-Fi network for building an IoT system is usually applied in the prior art.

However, one issue with connecting to Wi-Fi networks is that it is not a simple and user-friendly process. A user generally needs to discover nearby gateway device, manually surf through a variety of different service set identifiers (SSIDs) identifying the Wi-Fi networks, select one of the networks, and enter credentials.

SUMMARY OF THE INVENTION

The invention is directed to method for automatically establishing a wireless connection, a gateway device and a client device for internet of things (IoT) using the same, which are capable of resolving the problem mentioned in the related art.

The invention provides a method for automatically establishing a wireless connection between a client device and a gateway device of internet of things (IoT). The method includes following steps: encrypting an access password of the gateway device, so as to generate an encryption password; generating a service set identifier (SSID) of the gateway device, in which the SSID includes an index and the encryption password; selecting the SSID according to the index by the client device, so as to acquire the encryption password from the selected SSID; decrypting the encryption password by the client device, so as to acquire the access password; and connecting the selected SSID using the acquired access password by the client device, so as to establish the wireless connection between the client device and the gateway device.

The invention provides a gateway device for IoT adapted for providing a wireless network connection service to at least one client device. The gateway device includes a wireless communication circuit, a memory circuit, and a processing unit. The wireless communication circuit is adapted for wirelessly connecting to at least one surrounding client device. The memory circuit stores a plurality of modules. The processing unit is coupled to the wireless communication circuit and the memory circuit, in which the processing unit controls operation of the wireless communication circuit and accesses the memory circuit for executing the modules. The modules include an encryption module, a SSID generating module, and a connection module. The encryption module encrypts an access password of the gateway device, so as to generate an encryption password. The SSID generating module generates a SSID of the gateway device, in which the SSID includes an index and the encryption password. The connection module receives connection request sent from at least one client device and checks whether an access password of the connection request is correct, so as to establish a wireless connection with the at least one client device sending the correct access password.

The invention provides a client device for IoT including a wireless communication circuit, a memory circuit, and a processing unit. The wireless communication circuit is adapted for wirelessly connecting to a gateway device. The memory circuit stores a plurality of modules. The processing unit is coupled to the wireless communication circuit and the memory circuit, in which the processing unit controls operation of the wireless communication circuit and accesses the memory circuit for executing the modules. The modules include a SSID scanning module, a decryption module, and a connection module. The SSID scanning module scans SSIDs of surrounding gateways so as to select one of the SSIDs according to an index, and acquires an encryption password from the selected SSID. The decryption module decrypts the encryption password, so as to acquire an access password. The connection module sends a connection request including the access password to the gateway device having the selected SSID for establishing a wireless connection.

According to the above descriptions, the embodiments of the invention provide a method for automatically establishing a wireless connection, a gateway device and a client device for IoT using the same. By applying the method of the invention, the client device may automatically connect to the gateway device without manually typing the access password. Therefore, there is no need for a user to search the SSID list for the gateway device to be connected and then to manually type the access password for accessing the gateway device when the user wants to build an IoT system. The IoT system can be built as long as the user turns the gateway device and the client device on, and thus the convenience of building an IoT system may be significantly enhanced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
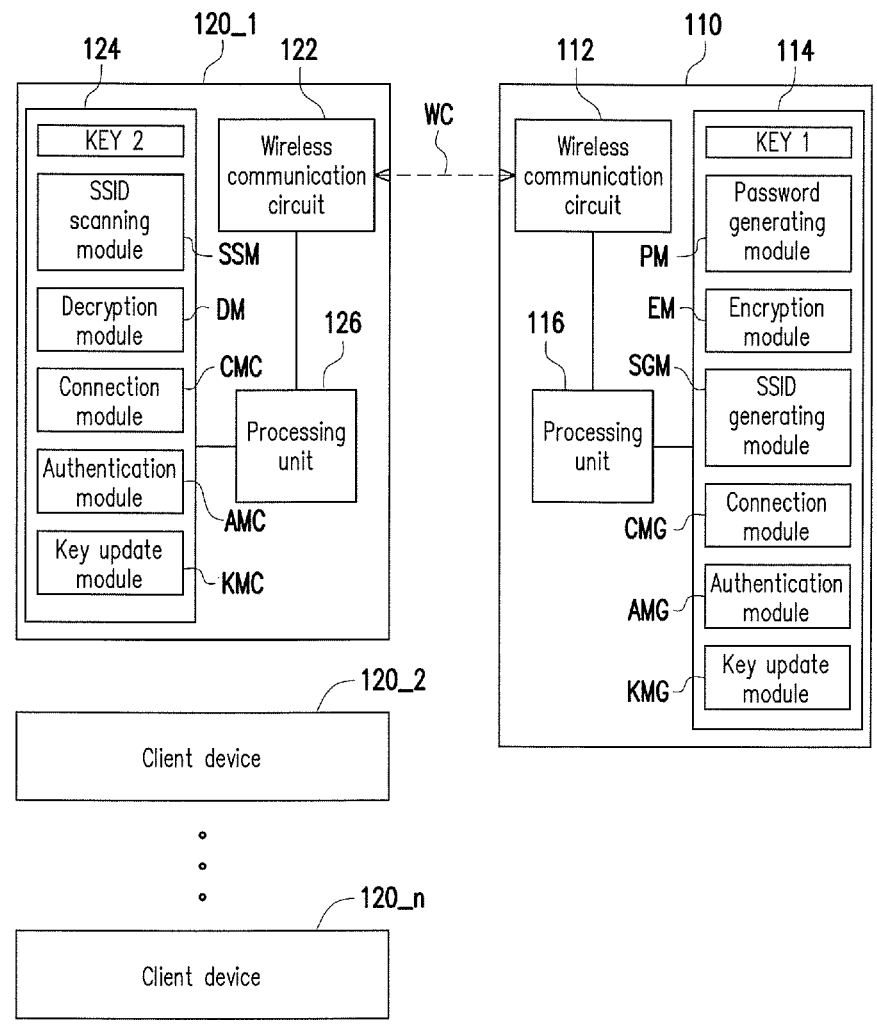
FIG. 1 is a schematic diagram of an IoT system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of an IoT system according to an embodiment of the invention. Referring to FIG. 1, the IoT system 100 of the present embodiment includes a gateway device 110 and one or plural client devices 120_1-120_n, in which n is a positive integer.

Gateway device 110 is adapted for providing a wireless network connection service to the client devices 120_1-120_n, so that the client devices 120_1-120_n capable of connecting to the Internet via the gateway device 110. In the application of IoT, the client devices 120_1-120_n may be implemented in general electric equipment, such as an air conditioner, a refrigerator, a vehicle, or a mobile phone. The present invention is not limited thereto.

In the present embodiment, gateway device 110 includes a wireless communication circuit 112, a memory circuit 114, and a processing unit 116. The communication circuit 112 is coupled to the processing unit 116 for wirelessly connecting to the client devices 120_1-120_n. The communication circuit 112 can be implemented by a wireless transceiver, which supports a wireless communication protocol, such as the Wireless Fidelity (Wi-Fi) protocol.

The memory circuit 114 is coupled to the processing unit 116. It can be a random access memory (RAM), read-only memory (ROM), flash memory, or any other similar components or combination thereof. In the present embodiment, the memory circuit 114 is configured to store a plurality of modules. The modules may be programs or applications stored in the memory circuit 114 for providing different functions. In addition, during some embodiments of the present invention, the memory circuit 114 further stores a first passkey KEY1. The first passkey KEY1 is used in the procedure for connecting to the client devices 120_1~120_n.

The processing unit 116 is hardware (e.g., a chipset, a processor and set forth) having computing capability for controlling the entire operation of the gateway device 110. In the present exemplary embodiment, the processing unit 116 is, for example, a central processing unit (CPU) or any other programmable microprocessor or digital signal processor (DSP), programmable controller, application specific integrated circuits (ASIC), programmable logic device (PLD) or the like. The processing unit 116 may accesses the modules stored in the memory circuit 114, so as to execute the functions of the modules.

Specifically, the modules stored in the memory circuit 114 of the gateway device 110 includes a password generating module PM, an encryption module EM, a service set identifier (SSID) generating module SGM, a connection module CMG, an authentication module AMG, and a key update module KMG, in which the authentication module AMG and the key update module KMG are selectively disposed in the memory circuit 114, and the present invention is not limited thereto. The function of said modules may be described later in the part of the method for automatically establishing a wireless connection.

Each of the client devices 120_1~120_n, taking the client device 120_1 for the example, includes a wireless communication circuit 122, a memory circuit 124, and a processing unit 126.

The communication circuit 122 is coupled to the processing unit 126 for wirelessly connecting to the gateway device 110. Similar with the communication circuit 112 of the gateway device 110, the communication circuit 122 can be implemented by a wireless transceiver, which supports a wireless communication protocol, such as the Wireless Fidelity (Wi-Fi) protocol.

The memory circuit 124 is coupled to the processing unit 126. In the present embodiment, the memory circuit 124 is configured to store a plurality of modules. The modules may be programs or applications stored in the memory circuit 124 for providing different functions. In addition, during some embodiments of the present invention, the memory circuit 124 further stores a second passkey KEY2. The second passkey KEY2 is used in the procedure for connecting to the gateway device 110.

The processing unit 126 is hardware, similar with the processing unit 116, having computing capability for controlling the entire operation of the gateway device 110. The processing unit 126 may access the modules stored in the memory circuit 124, so as to execute the functions of the modules.

Specifically, the modules stored in the memory circuit 124 of the client device 120 includes a SSID scanning module SSM, a decryption module DM, a connection module CMC, an authentication module AMC, and a key update module KMC, in which the authentication module CMC and the key update module KMC are selectively disposed in the memory circuit 124, and the present invention is not limited thereto.

Figure 2:
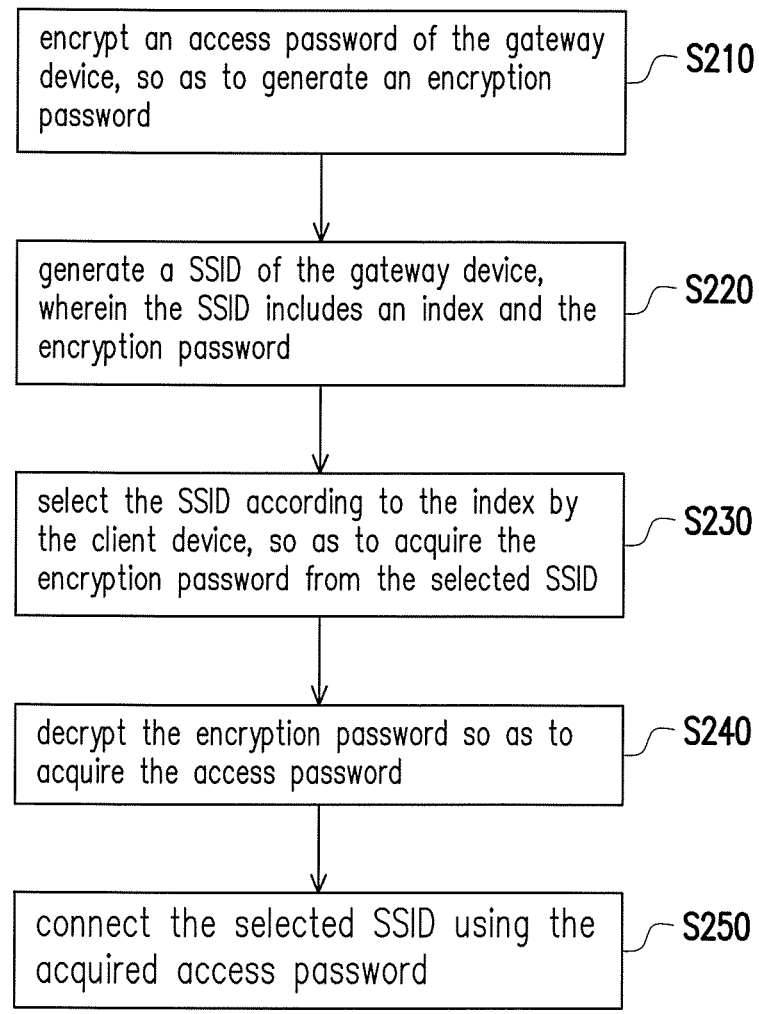
FIG. 2 is a flowchart of a method for automatically establishing a wireless connection between a client device and a gateway device for IoT according to an embodiment of the invention.

Under the IoT system 100 of the present embodiment, the client device 120_1-120_n may automatically connect to the gateway device 110 by applying the method illustrating in FIG. 2, in which steps of the method are respectively executed by the gateway device 110 and the client device 120_1-120_n by accessing the modules stored in the memory circuit 114 and 124. FIG. 2 is a flowchart of a method for automatically establishing a wireless connection between a client device and a gateway device for IoT according to an embodiment of the invention.

The interaction between the client device 120_1 and the gateway device 110 is taken as an example to be illustrated below for describing the method for automatically establishing a wireless connection of the present embodiment. One of ordinary in the art may implement the method in the rest of the client device 120_2-120_n by referring the following description. Therefore, the method for automatically establishing a wireless connection between the rest of the client device 120_2-120_n and the gateway device 110 are omitted to describe.

Referring to FIG. 1 and FIG. 2, in step S210, the encryption module EM is executed for encrypting an access password of the gateway device, so as to generate an encryption password, in which the access password is generated by password generating module PM.

In step S220, the SSID generating module SGM is executed for generating a service set identifier (SSID) of the gateway device 110, in which the string of the SSID may include an index and the encryption password generated by the encryption module EM.

After the SSID has been generated, in step S230, the SSID scanning module SSM is executed for selecting the SSID according to the index within the string of the SSID, and thus the client device 120_1 acquires the encryption password from the string of the selected SSID.

In step S240, the decryption module DM is executed for decrypting the encryption password, and thus the client device 120_1 acquires the access password.

After the access password is acquired by the client device 120_1, in the step S250, the connection module CMC of the client device 120_1 is executed for sending a connection request based on the acquired access password to the gateway device 110. The connection module CMG of the gateway device 110 is executed for authenticating whether the received password is matched with the access password of the gateway device 110. When the received password is authenticated, the gateway device 110 sends a connection response to the client device 120_1 to acknowledge the connection request of the client device 120_1 and establishes the wireless connection WC with the client device 120_1. In other words, in step S250, the client device 120_1 may connect the selected SSID using the acquired access password, so as to establish the wireless connection WC with the gateway device 110.

In the present embodiment, there are several different ways for encrypting the access password and decrypting the encryption password. For example, in an exemplary embodiment, the gateway device 110 and the client device 120_1 may utilize corresponding algorithms for encrypting the access password/decrypting the encryption password without passkey. In another exemplary embodiment, the gateway device 110 and the client device 120_1 may utilize corresponding passkeys KEY1 and KEY2 for encrypting the access password/decrypting the encryption password. It would be described in the following paragraphs.

In the present embodiment, the wireless connection WC is, for example, a Wi-Fi connection, which is established based on Wi-Fi Protected Access (WPA) protocol or Wi-Fi Protected Access2 (WPA2) protocol. That is, step S250 of the present embodiment may further includes step of performing four-way handshake between the client device 120_1 and the gateway device 110. The present invention is not limited thereto.

Figure 3:
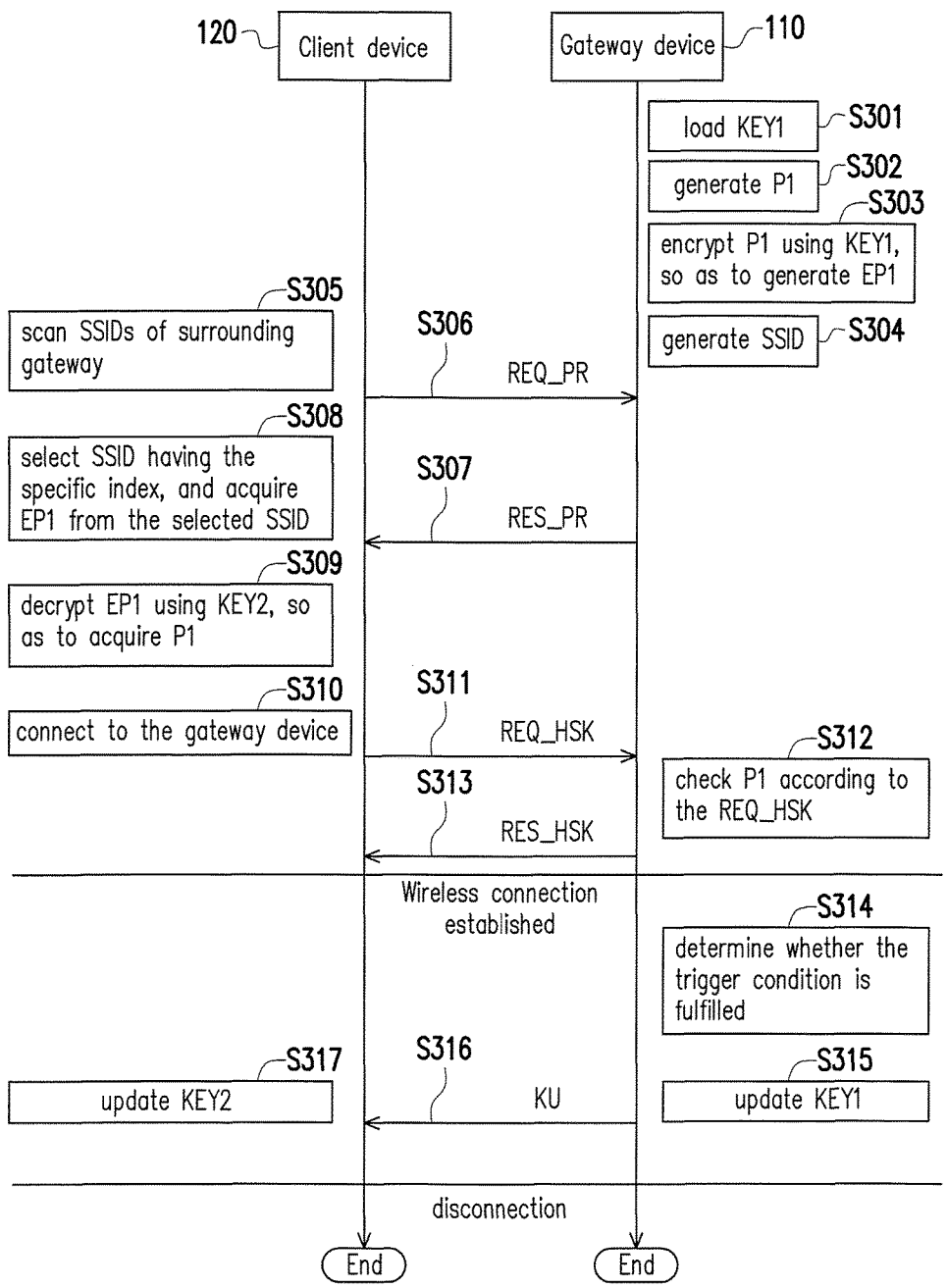
FIG. 3 is a schematic flowchart illustrating a process of establishing a wireless connection between a client device and a gateway device according to an embodiment of the invention.
Figure 4:
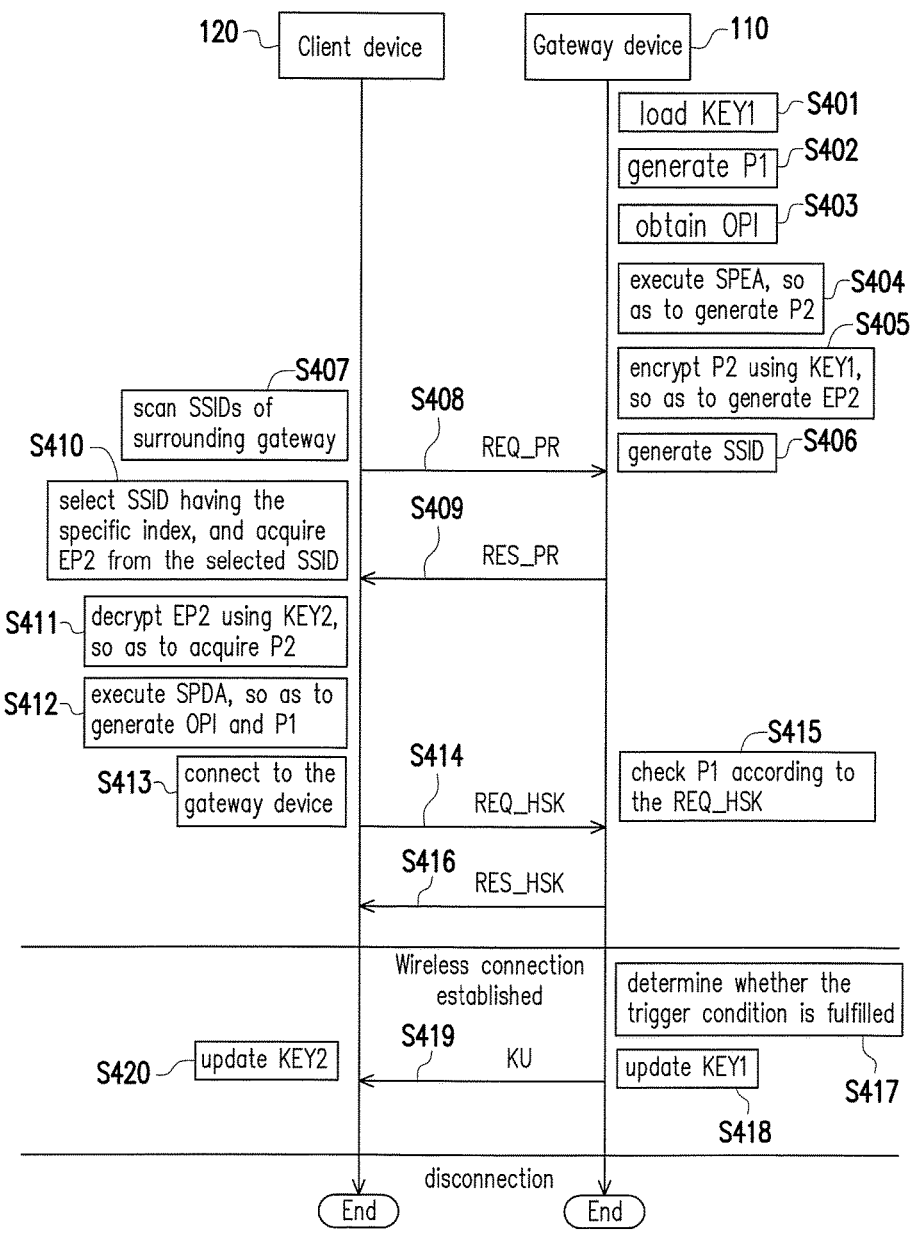
FIG. 4 is a schematic flowchart illustrating a process of establishing a wireless connection between a client device and a gateway device according to another embodiment of the invention.
Figure 5:
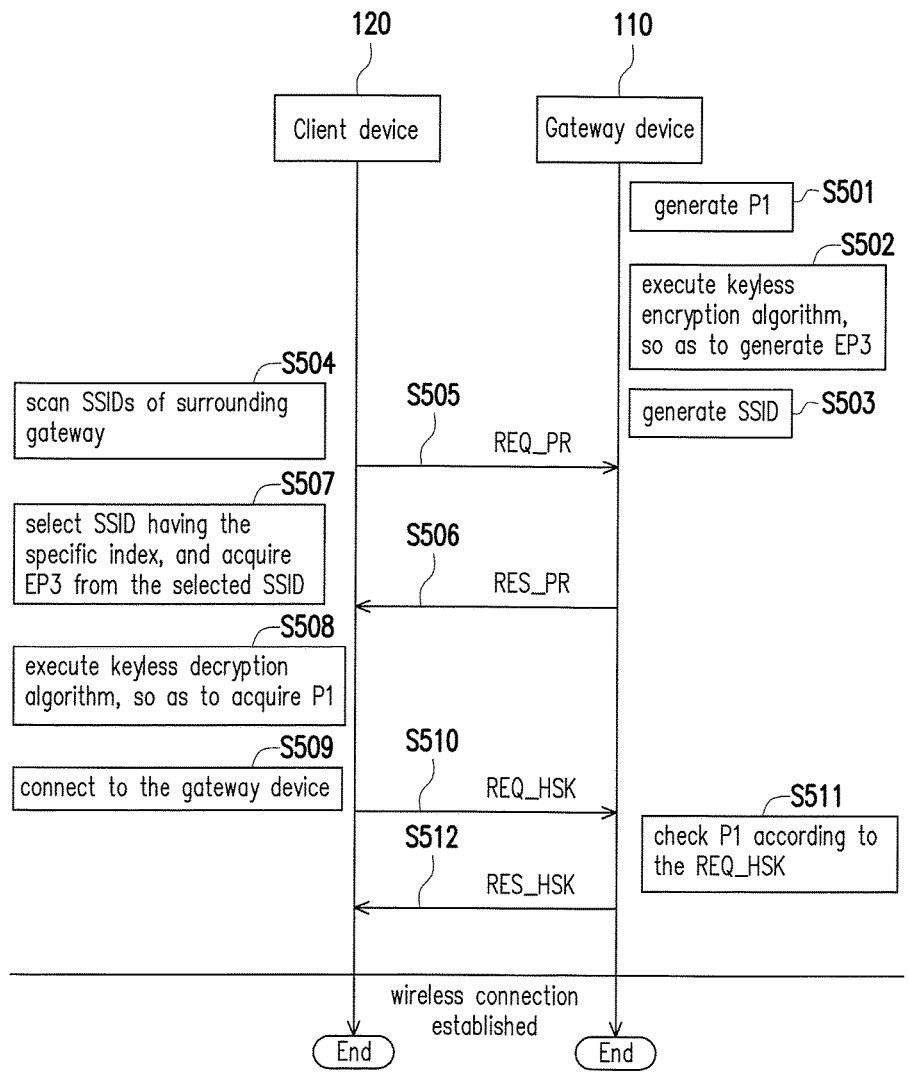
FIG. 5 is a schematic flowchart illustrating a process of establishing a wireless connection between a client device and a gateway device according to still another embodiment of the invention.

FIG. 3 to FIG. 6 schematically illustrate processes of establishing the wireless connection WC between the client device 120 and the gateway device 110 according to different embodiments of the invention to further elaborate the method for automatically establishing the wireless connection WC between the client device 120 and the gateway device 110. FIG. 3 and FIG. 4 illustrate the embodiments of encrypting/decrypting the passwords by using the passkeys. FIG. 5 illustrates the embodiment of encrypting/decrypting the passwords by executing the keyless encryption/decryption algorithms.

According to the embodiments of encrypting/decrypting the passwords by using the passkeys, it should be noted that the first passkey KEY1 and the second passkey KEY2 should be respectively provided to the gateway device 110 and the client device 120 at first. Values (usually composed of a plurality of bits) of the first passkey KEY1 and the second passkey KEY2 can be recorded, as a form of a table, in the memory circuit 114 and 124, and the values of the first passkey KEY1 and the second passkey KEY2 are preset to correspond to each other. However, how to provide the first passkey KEY1 and the second passkey KEY2 to the gateway device 110 and the client device 120 is not limited thereto.

For example, in an exemplarily embodiment, the values (or the tables) of the first passkey KEY1 and the second passkey KEY2 can be pre-recorded in the memory circuit 114 and 124 when the gateway device 110 and the client device 120_1 are manufactured. Therefore, the gateway device 110 and the client device 120_1 may automatically load the first passkey KEY1 and the second passkey KEY2 when the gateway device 110 and the client device 120_1-120_n are powered on.

In another exemplarily embodiment, the values of the first passkey KEY1 and the second passkey KEY2 can be manually set by the users. For instance, the user may set the first passkey KEY1 and the second passkey KEY2 by their own before they use the gateway device 110 and the client device 120_1, and thus the gateway device 110 and the client device 120_1-120_n may load the first passkey KEY1 and the second passkey KEY2 set by the user when the gateway device 110 and the client device 120_1 are powered on.

In still another exemplarily embodiment, the values of the first passkey KEY1 and the second passkey KEY2 can be automatically set by the gateway device 110 and the client device 120_1 after the wireless connection WC is established for the first time. For example, the user may manually set the gateway device 110 and the client device 120_1 for establishing the wireless connection WC for the first time. Once the wireless connection WC is established, one of the gateway device 110 and the client device 120_1 may randomly generate the value of the first passkey KEY1/second passkey KEY2, and then provide the generated first passkey KEY1/second passkey KEY2 to the other one of the gateway device 110 and the client device 120_1. Accordingly, the present invention does not limit how the first passkey KEY1 and the second passkey KEY2 be provided.

Referring to FIG. 3, in step S301, when the gateway device 110 is enabled, the gateway device 110 may load the first passkey KEY1 (e.g., KSDFGVBH), and then generate an access password P1 (e.g., 12345678) in step S302. In the present embodiment, the access password P1 may be randomly generated, but the present invention is not limited thereto.

After the access password P1 has been generated, in step S303, the gateway device 110 may encrypt the access password P1 using the first passkey KEY1, so as to generate an encryption password EP1 (e.g., %%Dsadfge). In the present embodiment, the access password P1 can be encrypted by applying an asymmetric encryption algorithm (e.g., RSA algorithm, ECC algorithm, and so on) or a symmetric encryption algorithm (e.g., DES algorithm, AES algorithm, and so on), and the present invention is not limited thereto.

Herein, the AES algorithm is taken as an example in step S303, and the encryption password EP1 can be represented as EP1=AES(P1, KEY1).

In step S304, the gateway device 110 may generate a SSID according to an index and the encryption password EP1, in which the index can be designed by the designer. For example, if the index is "AAA", the SSID generated by the gateway device 110 may be in the form of "AAA%%Dsadfge".

In view of the client device 120, when the client device 120 is enabled, the client device 120 may scan SSIDs of surrounding gateway devices or access points (APs) (step S305). During step S305, the client device 120 may send a probe request REQ_PR to the gateway device 110 (step S306), such that the gateway device 110 sends a probe response RES_PR, including information of the SSID, back to the client device 120 when receiving the probe request (step S307).

After the client device 120 receives the probe response RES_PR of the surrounding gateways or APs, client device 120 may select the SSID having the specific index like "AAA", and acquire the encryption password EP1 from the selected SSID (step S308). For example, the client device 120 may determine whether the scanned SSID has the index of "AAA" and select the SSID having the index of "AAA" as the SSID to be connected. According to the aforementioned example, the client device 120 may select the SSID, shown as "AAA%%Dsadfge", of the gateway device 110 as the SSID to be connected. The client device 120 may further delete the index of "AAA" in the SSID and take the rest of string, shown as "%%Dsadfge", as the encryption password EP1.

After the client device 120 acquires the encryption password EP1, the client device 120 may decrypt the encryption password EP using the second passkey KEY2, which is loaded from the memory circuit 124, so as to acquire the access password P1 from the encryption password EP1 (step S309). For example, client device 120 may decrypt the encryption password EP1 represented as the string of "%%Dsadfge" using the second passkey KEY2, which has the same value (e.g., KSDFGVBH) with the first passkey KEY1, so as to acquire the access password P1.

In step 310, the client device 120 starts to connect to the gateway device 110 according to the selected SSID and the acquired access password P1. Specifically, during step S310, the client device 120 sends a connection request REQ_HSK based on the access password P1 to the gateway device 110 having the selected SSID (step S311). When the connection request REQ_HSK is received by the gateway device 110, the gateway device 110 may check whether the access password is correct according to the received connection request REQ_HSK (step S312), so as to authenticate whether the client device 120 is valid. The gateway device 110 may send a connection response RES_HSK back to the client device 120 when the client device 120 is determined to be valid (step S313), so as to notice the client device 120 that the connection request REQ_HSK has been acknowledged. The wireless connection WC between the client device 120 and the gateway device 110 is established after step S312.

In other words, according to the method described in the present embodiment, the encrypted access password P1 of the gateway device 110 can be used as part of the SSID string. The client device 120 may identify the gateway device 110 to be connected according to an index within the SSID string and acquire the encrypted access password P1 from the SSID string. Since the encrypted access password P1 can be decrypted by using the second passkey KEY2, which has the same value with the first passkey KEY1 used for encrypting the access password P1, the client device 120 may obtain the access password P1 without manually typing. Accordingly, the wireless connection WC between the client device 120 and the gateway device 110 can be automatically established.

It should be noted that, in the practical application, the steps S310 to S313 can be implemented by four way handshake algorithm, but the present invention is not limited thereto.

Under the conception of the present embodiment, when a user wants to build an IoT system, there is no need for the user to search the SSID list for the gateway device to be connected and then to manually type the access password for accessing the gateway device. By applying the method described in the present embodiment, the IoT system can be built as long as the user turns on the gateway device 110 and the client device 120, and thus the convenience of building an IoT system 100 may be significantly enhanced.

In one exemplary embodiment, the first passkey KEY1 and the second passkey KEY2 can be updated after the wireless connection WC is established, so as to improve the connection security.

Specifically, after the wireless connection WC is established, the gateway device 110 may determine whether a trigger condition is fulfilled (step S314). When the trigger condition is fulfilled, the gateway device 110 may update the value of the first passkey KEY1 (step S315). In the present exemplary embodiment, the trigger condition can be designed as to be fulfilled when the connection time reaches a default period (e.g., twenty-four hours), when the gateway device 110 is attacked, or when the setting of the first passkey KEY1 is manually modified by the user, and so on. The present invention is not limited thereto.

After the first passkey KEY1 has been updated, the gateway device 110 may send information KU including the updated first passkey KEY1 to the client device 120 via the wireless connection WC (step S316).

The client device 120 may update the value of the second passkey KEY2, according to the updated first passkey KEY1, when the value of the updated first passkey KEY1 is different from the second passkey KEY2 (step S317). In other words, during step S317, the client device 120 may save the received passkey as the updated second passkey KEY2, in which the updated second passkey KEY2 may be used for next connection.

In another exemplary embodiment, if a new client device (e.g., 120_2) is added to the IoT system 100 for connecting to the gateway device 110 when the first passkey KEY1 has updated, which is different from the second passkey of the newly added client device, the user may have to enter the access password for the first connection or manually update the second passkey of the newly added client before the wireless connection establishing.

It should be noted that, in view of the hardware operation, steps S314 to S316 can be implemented by the processing unit 116 of the gateway device 110 by executing the key update module KMG stored in the memory circuit 114, and step S317 can be implemented by the processing unit 126 of the client device 120 by executing the key update module KMC stored in the memory circuit 124.

FIG. 4 is a schematic flowchart illustrating a process of establishing a wireless connection between a client device and a gateway device according to another embodiment of the invention.

In the present embodiment, the method for automatically establishing the wireless connection is basically similar with the previous embodiment. Main difference between the present and the previous embodiments is that the gateway device 110 further executes a security password encryption algorithm, according to operational information of the gateway device 110, to the access password for further improving the connection security.

Referring to FIG. 4, in step S401 and step S402, when the gateway device 110 is enabled, the gateway device 110 may load the first passkey KEY1 (e.g., KSDFGVBH), and then generate an access password P1 (e.g., 12345678).

After the access password P1 has been generated, in step S403, the gateway device 110 may obtain the operational information OPI of the gateway device 110. In the present embodiment, the operational information OPI can be at least one of a current date counting by the gateway device 110 and a media access control (MAC) address of the gateway device 110, but the present invention is not limited thereto.

In step S404, gateway device 110 may execute the security password encryption algorithm SPEA according to the operational information OPI and the access password P1, so as to generate a security password P2, in which the security password P2 can be represented as P2=SPEA(OPI, P1). For example, if the operational information OPI includes the MAC address of "00:00:df:a9:04:0f" and the current date of "20150922". When the security password encryption algorithm SPEA is executed, the current date can be added to the access password P1, so as to generate a string of "32496600". The last three bytes of the MAC address may be extracted and recombined as a string of "5ff6b0". Therefore, the security password P2 can be a combination of strings of "32496600" and "5ff6b0", such as a string of "352f4f966b6000", which is generated by interleaved inserting each bit of the string of "5ff6b0" into the string of "32496600".

After the security password P2 has been generated, in step S405, the gateway device 110 may encrypt the security password P2 using the first passkey KEY1, so as to generate an encryption password EP2 (e.g., $$weqfsd), in which the encryption password EP2 can be represented as EP2=AES (P2, KEY1).

In step S406, similar with step S304 of the previous embodiment, the gateway device 110 may generate a SSID according to an index and the encryption password EP2, in which the index can be designed by the designer. For example, if the index is "AAA", the SSID generated by the gateway device 110 may be in the form of "AAA$$weqfsd".

In view of the client device 120, when the client device 120 is enabled, the client device 120 may scan SSIDs of surrounding gateways or APs (step S407). During step S407, the client device 120 may send a probe request REQ_PR to the gateway device 110 (step S408), such that the gateway device 110 sends a probe response RES_PR, including information of the SSID, back to the client device 120 when receiving the probe request (step S409).

After the client device 120 receives the probe response RES_PR of the surrounding gateways or APs, client device 120 may select the SSID having the specific index like "AAA", and acquire the encryption password EP2 from the selected SSID (step S410). For example, the client device 120 may determine whether the scanned SSID has the index of "AAA" and select the SSID having the index of "AAA" as the SSID to be connected. According to the aforementioned example, the client device 120 may select the SSID, shown as "AAA$$weqfsd", of the gateway device 110 as the SSID to be connected. The client device 120 may further delete the index of "AAA" in the SSID and take the rest of string, shown as "$$weqfsd", as the encryption password EP2.

After the client device 120 acquires the encryption password EP2, the client device 120 may decrypt the encryption password EP2 using the second passkey KEY2, which is loaded from the memory circuit 124, so as to acquire the security password P2 from the encryption password EP2 (step S411). For example, client device 120 may decrypt the encryption password EP2 represented as the string of "$$weqfsd" using the second passkey KEY2, which has the same value (e.g., KSDFGVBH) with the first passkey KEY1, so as to acquire the security password P2.

In step S412, the client device 120 may execute a security password decryption algorithm SPDA according to the security password P2, so as to acquire the operational information OPI and the access password P1. For example, when the security password decryption algorithm SPDA is executed, the client device 120 may acquire the access password P1 (i.e., 12345678), the last three bytes of the MAC address (i.e., a9:04:0f) and the current date (i.e., 20150922) from the security password P2 (e.g., 352f4f966b6000).

In step S413, the client device 120 starts to connect the gateway device 110 according to the selected SSID and the acquired access password P1. Specifically, during step S413, the client device 120 sends a connection request REQ_HSK to the gateway device 110 having the selected SSID (step S414). When the connection request REQ_HSK is received by the gateway device 110, the gateway device 110 may check whether the access password P1 is correct according to the received connection request REQ_HSK (step S415).

In step S416, if the access password P1 is correct, the gateway device 110 may send a connection response RES_HSK back to the client device 120, so as to notice the client device 120 that the connection request REQ_HSK has been acknowledged. The wireless connection WC between the client device 120 and the gateway device 110 is established after step S416. It should be noted that, in the practical application, the steps S413 to S416 can be implemented by four way handshake algorithm, but the present invention is not limited thereto.

In an exemplary embodiment, the gateway device 110 may further authenticate the client device 120 before performing four way handshake, so as to enhance the safety of the connection.

For example, the gateway device 110 may ask the operational information OPI before performing four way handshake. At the meantime, the gateway device 110 starts to count time.

Since the client device 120 of the present embodiment is a valid client device, the client device 120 may send the operational information OPI to the gateway device 110. When the gateway device 110 receives the operational information OPI, the gateway device 110 compares the operational information OPI obtained from the client device 120 with the operational information OPI of the gateway device 110 for determining whether the client device 120 is a valid client, and sends an acknowledge response back to the client device 120 after determining the client device 120 is valid.

On the other hand, if the client device 120 is an invalid client device, the client device 120 would not send the operational information OPI or would send the operational information OPI with wrong format. Therefore, the gateway device 110 may determine the client device is an invalid client device when the operational information OPI obtained from the client device 120 is mismatched with the operation information OPI of the gateway device 110 or the gateway device 110 has not received the operational information OPI for a preset period. In the present exemplary embodiment, the four way handshake is performed only if the client device 120 is determined to be valid according to the operational information OPI. In other words, as long as the client device 120 is determined as an invalid device, the gateway device 110 may deny executing the following procedure.

Since steps S417 to S420 which are the process for updating the first passkey KEY1 and the second passkey KEY2 are similar with step S314 to S317 of the previous embodiment, steps S417 to S420 are omitted to describe.

It should be noted that, in view of the hardware operation, steps S403 and S404 can be implemented by the processing unit 116 of the gateway device 110 by executing the encryption module EM stored in the memory circuit 114, and step S412 can be implemented by the processing unit 126 of the client device 120 by executing the decryption module DM stored in the memory circuit 124. It should also be noted that the priority of executing above steps is not limited thereto.

FIG. 5 is a schematic flowchart illustrating a process of establishing a wireless connection between a client device and a gateway device according to still another embodiment of the invention.

In the present embodiment, the method for automatically establishing the wireless connection is basically similar with the previous embodiments. Main difference between the present and the previous embodiments is that the access password is encrypted by executing a keyless encryption algorithm and the encryption password is decrypted by executing a keyless decryption algorithm corresponding to the keyless encryption algorithm.

Referring to FIG. 5, in step S501 and step S502, when the gateway device 110 is enabled, the gateway device 110 may generate an access password P1, and then execute a keyless encryption algorithm, so as to generate an encryption password EP3.

In the present embodiment, the keyless encryption algorithm can be any kind of encryption/encoding algorithm, which performs some kind of computation or transformation on the input data stream (i.e., the access password or the encryption password) without using passkey, such as Script Encoder or One Time Password.

On the other hand, when the encryption password EP3 is acquired from the selected SSID, in step S508, the client device 120 may execute a keyless decryption algorithm, so as to acquire the access password P1 from the encryption password EP3.

In the present embodiment, the keyless decryption algorithm is designed for performing computation or transformation corresponding to the keyless encryption algorithm on the encryption password EP3.

Since step S503 to step S507 are similar with step S304 to S308 and step S509 to step S512 are similar with S310 to S313 of the previous embodiment, step S503 to S507 and step S509 to step S512 are omitted to describe.

It should be noted that, although the aforementioned embodiments teach that the client device 120 obtains the SSID of the gateway device 110 by sending the probe request REQ_PR to the gateway device 110, the way of obtaining the SSID of the gateway device of the present invention is not limited thereto. In an exemplary embodiment, the gateway device 110 also can broadcast a beacon containing the SSID, such that the client device 120 acquires the SSID when receiving the beacon.

Figure 6:
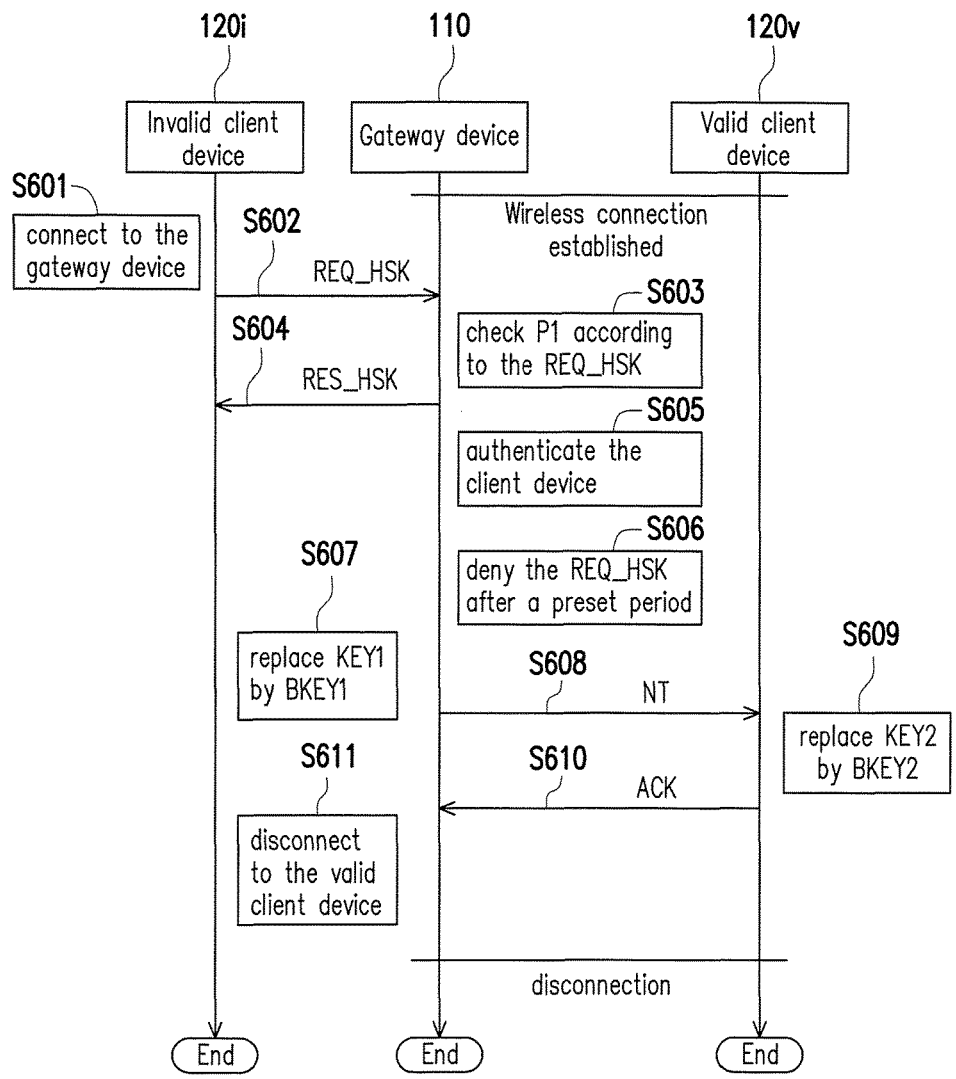
FIG. 6 is a schematic flowchart illustrating a process of denying an invalid client device from connecting to a gateway device according to an embodiment of the invention.

FIG. 6 is a schematic flowchart illustrating a process of denying an invalid client device from connecting to a gateway device according to an embodiment of the invention.

Referring to FIG. 6, the present embodiment illustrates a situation of an invalid client device 120*i*, having the correct access password P1, is trying to connect the gateway device 110, in which a valid wireless connection between the gateway device 110 and a valid client device 120*v* has already been established.

In step S601 and step S602, the invalid client device 120*i* is trying to connect to the gateway device 110 using the correct access password P1, so as to send a connection request REQ_HSK according to the access password P1 to the gateway device 110. When the connection request REQ_HSK is received by the gateway device 110, the gateway device 110 may check whether the access password is correct according to the received connection request REQ_HSK (step S603).

In step S604, since the invalid client device 120*i* has the correct access password P1, the gateway device 110 may determine the connection request is valid and assign an IP address to the invalid client device 120*i*. It should be noted that, in the practical application, the steps S601 to S604 can be implemented by four way handshake algorithm, but the present invention is not limited thereto.

However, in step S605, the gateway device 110 may further authenticate the client device 120*i* after the wireless connection WC is established, so as to determine whether the client device 120 is a valid client device. Once the gateway device 110 determines that the client device 120*i* is invalid, the gateway device 110 may disconnect the wireless connection WC.

Specifically, during step S605, the gateway device 110 may determine whether the authentication information, sent from the client device 120*i*, is received. In the present embodiment, since the client device 120*i* is invalid, the gateway device 110 would not receive the authentication information, so that the gateway device 110 denies the connection request after a preset period (step S606). It should be noted that, in the step S605, the authentication data switched between the client device 120*i* and the gateway device 110 can be transmitted by TCP protocol after the wireless connection WC is established.

At the meantime, the gateway device 110 may aware the valid client device 120*v* that the access password P1 and the passkeys KEY1 and KEY2 are hacked. In other words, the gateway device 110 may determine the trigger condition is fulfilled. Therefore, in step S607 and step S608, the gateway device 110 may use a first back-up passkey BKEY1 to replace the original first passkey KEY1 and send a security notice NT to the valid client device 120*v*.

The valid client device 120*v* may use a second back-up passkey BKEY2 to replace the original second passkey KEY2, in which values of the first and the second back-up passkeys BKEY1 and BKEY2 are corresponding to each other (step S609). After the passkey has been replaced, the valid client device 120*v* may send an acknowledge response ACK to the gateway device 110, so that the gateway device may disconnect the wireless connection WC with the valid client device when the data transmission through the wireless connection WC are finished. It should be noted that the priority of executing above steps is not limited thereto.

It should be noted that, in the step S605, the authentication data switched between the client device 120*i* and the gateway device 110 can be transmitted through TCP protocol after the wireless connection WC is established. Once the gateway device 110 determines that the client device 120*i* is invalid, the gateway device 110 may disconnect the wireless connection WC.

To sum up, the embodiments of the invention provide a method for automatically establishing a wireless connection, a gateway device and a client device for IoT using the same. By applying the method of the invention, the client device may automatically connect to the gateway device without manually typing the access password. Therefore, there is no need for a user to search the SSID list for the gateway device to be connected and then to manually type the access password for accessing the gateway device when the user wants to build an IoT system. The IoT system can be built as long as the user turns on the gateway device and the client device, and thus the convenience of building an IoT system may be significantly enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for automatically establishing a wireless connection between a client device and a gateway device of internet of things (IoT) comprising:
    encrypting an access password of the gateway device, and generating an encryption password by the gateway device;
    generating a service set identifier (SSID) of the gateway device by the gateway device by using the encryption password, and wirelessly broadcasting a beacon containing the generated SSID by the gateway device, wherein the SSID comprises an index and the encryption password;
    selecting the SSID according to the index through wirelessly receiving the beacon by the client device, and acquiring the encryption password from the selected SSID by the client device;
    decrypting the encryption password by the client device and acquiring the access password by the client device; and
    connecting the selected SSID using the acquired access password by the client device and establishing the wireless connection between the client device and the gateway device.

2. The method of claim 1, wherein the access password is encrypted by executing a keyless encryption algorithm and the encryption password is decrypted by executing a keyless decryption algorithm corresponding to the keyless encryption algorithm.

3. The method of claim 1, further comprising:
    respectively providing a first passkey and a second passkey to the gateway device and the client device, wherein the first passkey and the second passkey are preset to have the same value,
    wherein the access password is encrypted by using the first passkey and the encryption password is decrypted by using the second passkey.

4. The method of claim 3, wherein the access password is encrypted by utilizing one of an asymmetric encryption algorithm and a symmetric encryption algorithm.

5. The method of claim 3, wherein the step of encrypting the access password of the gateway device comprises:
    obtaining operational information of the gateway device;
    executing a security password encryption algorithm according to the operational information and the access password, so as to generate a security password; and
    encrypting the security password using the first passkey, so as to generate the encryption password.

6. The method of claim 5, wherein the step of decrypting the encryption password comprises:
    decrypting the encryption password using the second passkey, so as to acquire the security password; and
    executing a security password decryption algorithm according to the security password, so as to acquire the operational information and the access password.

7. The method of claim 6, further comprising:
    authenticating the client device before the wireless connection is established, so as to determine whether the client device is a valid client device;
    allowing the establishment of the wireless connection if the client device is the valid client device; and
    denying the establishment of the wireless connection if the client device is an invalid client device.

8. The method of claim 7, wherein the step of authenticating whether the client device is the valid client device before the wireless connection is established comprises:
    sending authentication information comprising the operational information, acquired by the client device, to the gateway device;
    comparing the operational information obtained from the authentication information with the operational information of the gateway device;
    determining the client device is the valid client device if the operational information obtained from the authentication information is matched with the operational information of the gateway device; and
    determining the client device is the invalid client device if the operational information obtained from the authentication information is mismatched with the operational information of the gateway device or the gateway device has not received the authentication information for a preset period.

9. The method of claim 7, further comprising:
    respectively replacing the first passkey and the second passkey by a first back-up passkey and a second back-up passkey when an invalid connection request sent from the invalid client device is aware; and
    disconnecting the wireless connection between the gateway device and the valid client device.

10. The method of claim 5, wherein the operational information comprises at least one of a current date counting by the gateway device and a media access control (MAC) address of the gateway device.

11. The method of claim 1, further comprising:
    updating the value of the first and the second passkeys after the wireless connection is established.

12. The method of claim 11, wherein the step of updating the value of the first and the second passkeys after the wireless connection is established comprises:
    updating the value of the first passkey when a trigger condition is fulfilled;
    sending the updated first passkey to the client device via the wireless connection; and
    updating the value of the second passkey according to the updated first passkey.

13. The method of claim 1, wherein the wireless connection is established based on Wi-Fi Protected Access (WPA) protocol or Wi-Fi Protected Access2 (WPA2) protocol.

14. A gateway device for IoT, adapted for providing a wireless network connection service to at least one client device, the gateway device comprising:
    a wireless communication circuit, adapted for wirelessly connecting to at least one surrounding client device;

a memory circuit, storing a plurality of modules; and
a processing unit, coupled to the wireless communication circuit and the memory circuit, wherein the processing unit controls operation of the wireless communication circuit and accesses the memory circuit for executing the modules, and the modules comprises:
an encryption module, encrypting an access password of the gateway device, and generating an encryption password;
a SSID generating module, generating a SSID of the gateway device by using the encryption password and wirelessly broadcasting a beacon containing the generated SSID, wherein the SSID comprises an index and the encryption password; and
a connection module, receiving connection request sent from at least one client device and checking whether an access password of the connection request is correct, and establishing a wireless connection with the at least one client device sending the correct access password.

15. The gateway device for IoT of claim 14, wherein the encryption module executes an keyless encryption algorithm for encrypting the access password.

16. The gateway device for IoT of claim 14, wherein the memory circuit further stores a first passkey and the encryption module further loads the first passkey from the memory circuit and encrypting the access password using the first passkey.

17. The gateway device for IOT of claim 16, wherein the encryption module further obtains operational information of the gateway device, executes a security password encryption algorithm according to the operational information and the access password, so as to generate a security password, and encrypts the security password using the first passkey, so as to generate the encryption password.

18. The gateway device for IoT of claim 17, wherein the modules further comprises:
an authentication module, authenticating the client device to be connected before the wireless connection is established, so as to determine whether the client device to be connected is a valid client device, wherein the authentication module allows the establishment of the wireless connection if the client device to be connected is the valid client device, and the authentication module denies the establishment of the wireless connection if the client device to be connected is an invalid client device.

19. The gateway device for IoT of claim 18, wherein the authentication module sends an authentication request to the client device to be connected and receives authentication information, the authentication module compares the operational information obtained from the authentication information with the operational information of the gateway device, and determines the client device is the valid client device if the operational information obtained from the authentication information is matched with the operational information of the gateway device and determines the client device is the invalid client device if the operational information obtained from the authentication information is mismatched with the operational information of the gateway device or the gateway device has not received the authentication information for a preset period.

20. The gateway device for IoT of claim 16, wherein the modules further comprises:
a passkey update module, updating the value of the first passkey when a trigger condition is fulfilled, and sending the updated first passkey to the connected client device via the wireless connection.

21. A client device for IoT, comprising:
a wireless communication circuit, adapted for wirelessly connecting to a gateway device;
a memory circuit, storing a plurality of modules; and
a processing unit, coupled to the wireless communication circuit and the memory circuit, wherein the processing unit controls operation of the wireless communication circuit and accesses the memory circuit for executing the modules, and the modules comprises:
a SSID scanning module, scanning SSIDs of surrounding gateways and selecting one of the SSIDs according to an index through wirelessly receiving a beacon, and acquiring an encryption password from the selected SSID;
a decryption module, decrypting the encryption password, and acquiring an access password; and
a connection module, sending a connection request comprising the access password to the gateway device having the selected SSID for establishing a wireless connection.

22. The client device for IoT of claim 21, wherein the decryption module executes a keyless decryption algorithm for decrypting the encryption password.

23. The client device for IoT of claim 21, wherein the gateway device has a first passkey and the memory circuit further stores a second passkey preset to have the same value with the first passkey, and the decryption module further loads the second passkey from the memory circuit and decrypting the encryption password using the second passkey.

24. The client device for IoT of claim 23, wherein the decryption module acquires a security password after decrypting the encryption password using the second passkey and the decryption module further executes a security password decryption algorithm according to the security password, so as to acquire operational information of the gateway device and the access password.

25. The client device for IoT of claim 24, wherein the modules further comprises:
an authentication module, sending authentication information when receiving an authentication request, wherein the authentication information comprises the operational information acquired from the security password.

26. The gateway device for IoT of claim 23, wherein the modules further comprises:
a passkey update module, receiving the first passkey sent from the gateway device, comparing the value of the received first passkey using the second passkey, and updating the value of the second passkey when the value of the first passkey is different from the original second passkey.

* * * * *